(12) United States Patent
Yamagishi

(10) Patent No.: US 9,344,898 B2
(45) Date of Patent: May 17, 2016

(54) BASE STATION, MOBILE COMMUNICATION SYSTEM, AND INTERFERENCE SUPPRESSION METHOD

(75) Inventor: Jun Yamagishi, Miyagi (JP)

(73) Assignee: Nokia Solutions and Networks Oy, Espoo (FI)

( * ) Notice: Subject to any disclaimer, the term of this patent is extended or adjusted under 35 U.S.C. 154(b) by 605 days.

(21) Appl. No.: 13/696,263

(22) PCT Filed: May 17, 2011

(86) PCT No.: PCT/JP2011/002731
§ 371 (c)(1),
(2), (4) Date: Nov. 5, 2012

(87) PCT Pub. No.: WO2011/148588
PCT Pub. Date: Dec. 1, 2011

(65) Prior Publication Data
US 2013/0051357 A1    Feb. 28, 2013

(30) Foreign Application Priority Data

May 28, 2010   (JP) .................................. 2010-123314

(51) Int. Cl.
*H04W 16/16*        (2009.01)
*H04J 11/00*         (2006.01)
(Continued)

(52) U.S. Cl.
CPC ........... *H04W 16/16* (2013.01); *H04J 11/0056* (2013.01); *H04J 2211/001* (2013.01); *H04L 1/0026* (2013.01); *H04W 16/32* (2013.01); *H04W 84/045* (2013.01); *Y02B 60/50* (2013.01)

(58) Field of Classification Search
CPC .......... H04W 52/244; H04W 72/0453; H04W 72/005
See application file for complete search history.

(56) References Cited

U.S. PATENT DOCUMENTS 5,491,834 A * 2/1996 Chia .............................. 455/441
5,771,454 A   6/1998 Ohsawa
(Continued)

FOREIGN PATENT DOCUMENTS

| | | |
|---|---|---|
| CN | 101662775 A | 3/2010 |
| EP | 2182751 A1 | 5/2010 |

(Continued)

OTHER PUBLICATIONS

TSG-RAN Working Group 4 (Radio) meeting #52bis, "Channel measurement based interference mitigation schemes for HeNBs," Institute for Information Industry (III), Coiler Corporation, R4-094002, Oct. 12-16, 2009, pp. 1-9.

(Continued)

*Primary Examiner* — Xavier Szewai Wong
*Assistant Examiner* — Edem A. Ayikoe
(74) *Attorney, Agent, or Firm* — Harrington & Smith

(57) ABSTRACT

Base station capable of suppressing interference of a large cell having high transmission power with a small cell having low transmission power and wherein frequency block division loss is low. Macrocell base station has: a frequency resource information generation unit, which calculates average value of allocated frequency resources, determines the calculated frequency resource average value on the basis of a resource allocation recurrence threshold, and generates frequency resource information from the result of the determination; an information control unit which notifies the frequency resource information to a femtocell; and first and second signal generation units which generate and output first report information which is cell information normally sent to a wireless communication terminal, and second report information which limits area that can be notified. Femtocell base station has an information control unit which, upon receiving the second report information, acquires the frequency resource information notified from the macrocell base station.

11 Claims, 9 Drawing Sheets

(51) Int. Cl.
*H04W 16/32* (2009.01)
*H04W 84/04* (2009.01)
*H04L 1/00* (2006.01)

(56) References Cited

U.S. PATENT DOCUMENTS

| | | | | |
|---|---|---|---|---|
| 6,111,886 | A * | 8/2000 | Stewart | H04L 5/06 370/438 |
| 2006/0160561 | A1* | 7/2006 | Uno et al. | 455/550.1 |
| 2007/0207737 | A1* | 9/2007 | Hui | H04W 16/14 455/63.1 |
| 2007/0287501 | A1* | 12/2007 | Hoshina | H04W 16/02 455/562.1 |
| 2008/0089282 | A1* | 4/2008 | Malladi et al. | 370/329 |
| 2009/0163220 | A1* | 6/2009 | Liu et al. | 455/452.1 |
| 2009/0213825 | A1* | 8/2009 | Gupta et al. | 370/338 |
| 2010/0008317 | A1* | 1/2010 | Bhattad et al. | 370/329 |
| 2010/0039974 | A1 | 2/2010 | Toshimitsu | |
| 2010/0197338 | A1* | 8/2010 | Bonneville | H04W 52/244 455/522 |
| 2010/0317351 | A1* | 12/2010 | Gerstenberger | H04W 8/26 455/443 |
| 2012/0093095 | A1* | 4/2012 | Barbieri | H04W 72/0426 370/329 |
| 2012/0281588 | A1 | 11/2012 | Damnjanovic | |
| 2013/0003580 | A1* | 1/2013 | Kovacs | H04W 72/082 370/252 |
| 2014/0213272 | A1 | 7/2014 | Hamabe et al. | |

FOREIGN PATENT DOCUMENTS

| | | |
|---|---|---|
| JP | 8-251655 | 9/1996 |
| JP | 2008-048148 | 2/2008 |
| JP | 2008-278263 | 11/2008 |
| JP | 2008-278265 | 11/2008 |
| JP | 2010-045561 | 2/2010 |
| WO | WO 2009044620 A1 | 4/2009 |
| WO | 2009/129413 | 10/2009 |

OTHER PUBLICATIONS

International Search Report dated Jun. 21, 2011.

* cited by examiner

BASE STATION, MOBILE COMMUNICATION SYSTEM, AND INTERFERENCE SUPPRESSION METHOD

TECHNICAL FIELD

The present invention relates to a base station, a mobile communication system, and an interference limiting method.

BACKGROUND ART

Setting a radio communication base station apparatus in the inside of a building such as an ordinary home or an office has been discussed, the radio communication base station apparatus covering a small cell (femtocell) having a cell radius of several tens of meters or less (referred to as "femtocell base station" or "Home Node-B (HNB)" or the like).

The femtocell base station under consideration in 3GPP (3rd Generation Partnership Project) LTE (Long Term Evolution) is also considered to allow only limited group members to have access. For example, when set at a home, the femtocell base station limits access only to family members of the home. Such a cell may be referred to as CSG (Closed Service Group) cell.

In this case, a UE (User Equipment) that is a mobile terminal granted access to the cell is preferentially connected to the femtocell base station. That is, when entering the area of the femtocell base station, the UE is preferentially connected to the femtocell base station, even if the UE can receive radio waves of an existing base station covering a cell having a larger cell radius than a femtocell (hereinafter, referred to as "macrocell" or "macrocell base station").

In general, a macro base station is interfered with radio waves transmitted by other macro base stations, and thus the macro base station is set in consideration of, for example, the distances to adjacent macro base stations so as not to generate interference. However, an operation is studied in which a user can voluntarily change the place to set the femtocell base station; hence, the femtocell base station placed in a cell of the existing macrocell will interfere with the macro base station at high probability. In addition, the number of femtocell base stations may become an order of tens of thousands or hundreds of thousands in some cases, which will significantly influence the existing macrocell base station. As a means of avoiding such interference, there is a method to receive averaged frequency resource information of the macro base station, to set a resource allocation recurrence threshold, and to preferentially allocate a frequency resource in the femtocell to a resource lower than the threshold.

In order to solve a case that the interference narrows the area of the femtocell base station, the femtocell base station applies a function for detecting the radio waves condition around the femtocell base station and adjusting output so as to minimize influence on the existing macrocell base station.

Patent literature 1 discloses a mobile communication system for acquiring information about the use of radio resources by the neighboring base station apparatus, through a mobile station apparatus present close to the neighboring base station apparatuses. The mobile communication system disclosed in patent literature 1 is configured, based on the acquired information, to prohibit a target base station apparatus from using a radio resource being used by the neighboring base station apparatus or to make it difficult to allocate user data to the radio resource.

CITATION LIST

Patent Literature

PTL 1
Japanese Patent Application Laid-Open No. 2008-278265

SUMMARY OF INVENTION

Technical Problem

However, in the above described layered cell configuration, there is a problem that a large cell with large transmission power interferes with a small cell with small transmission power.

As a solution to avoid the interference, adopting an access method typified by OFDMA (Orthogonal Frequency Division Multiple Access) and allocating different frequency blocks in the same band may be possible. However, when different frequency blocks are fixedly allocated, division loss occurs. In other words, there is a problem that, even though there is an unused vacant resource in the resource allocated to a macrocell base station or allocated to a femtocell base station, each of the base stations cannot use the resource allocated to the other base station.

To cope with such a problem, the macrocell base station acquires, via a radio terminal, information of the femtocell base station around the radio terminal. At least one of a frequency block, a time slot, and a code in a macrocell base station is prohibited to use based on the acquired information. Alternatively, adding an offset to CQI (Channel Quality Indicator) used for scheduling makes it difficult to allocate at least one of the frequency block, the time slot, and the code. The CQI means channel quality for each frequency unit used for transmission by the radio terminal, and CQI information measured by the radio terminal is notified to a base station via an uplink control channel.

However, the following problem still remains even if the above method is adopted. A detailed description will be given below.

FIG. 1 shows a conventional configuration including a macrocell and a femtocell.

As shown in FIG. 1, an area in which a signal transmitted by macrocell base station 1 using a radio signal can be received (hereinafter, an area in which a transmission signal can be received is referred to as "coverage area") is defined as macrocell 2. While femtocell 3 and femtocell 4 having a smaller cell radius than the macrocell exist in the macrocell, femtocell 3 is located close to the macrocell base station and femtocell 4 is located far from the macrocell base station.

A problem arises that femtocell 3 close to the macrocell base station is interfered with by the macrocell base station having large transmission power. The solution to avoid the interference will be described using FIG. 2.

FIG. 2 shows a conventional configuration of frequency domain resource blocks.

In the access method typified by OFDMA, allocating different frequency resource blocks in the same band may be possible. For example, as configuration 5 shown in FIG. 2, indices are given to resource blocks (hereinafter, referred to as "RB") in a frequency domain of the femtocell base station in the femtocell, in ascending order of frequency from RB1 to RB8.

When the different frequency blocks are fixedly allocated, the division loss occurs and then both of the macrocell and the femtocell cannot use an unused vacant resource. In this case, the femtocell base station information is acquired through a terminal in order to prohibit use of the frequency block, the time slot, or the code in the macrocell base station, or a CQI offset is added in order to preclude allocation of a resource of the macrocell base station. For example, when RB1, RB6, and RB7 are used, the macrocell base station cannot use these RBs.

If the macrocell base station uses the three RBs including RB1, RB6, and RB7 while the above femtocell base station uses three RBs including RB1, RB6, and RB7 in communication in configuration 6 of the RBs of the macrocell base station, interference occurs. For this reason, the above three RBs are defined as non-allocatable RBs in the macrocell base station. Thus, use of RBs other than the above three RBs by the macrocell base station enables communication without mutual interference.

FIG. 3 shows a conventional configuration of communication transmission between a macrocell base station and a femtocell base station.

As shown in FIG. 3, the coverage area of a signal transmitted by macrocell base station 7 using a radio signal is defined as macrocell 8. Also, the coverage area of a signal transmitted by femtocell base station 10 using a radio signal is defined as femtocell 11. In this case, macrocell base station 7 and femtocell base station 10 are connected via external control apparatus 9 using a cable (i.e., broadband line in general).

Radio communication terminal 12 notifies macrocell base station 7 of information of femtocell 11. That is, radio communication terminal 12 located inside of macrocell 8 notifies macrocell base station 7 of neighboring femtocell information, and macrocell base station 7 collects the femtocell information.

In the case of FIG. 3, the macrocell base station performs resource allocation control based on the information collected from femtocell base station 10 (see femtocell base station 10 to radio communication terminal 12 in FIG. 3a and radio communication terminal 12 to macrocell base station 7 in FIG. 3b).

In this case, even if it is possible to avoid the interference, a resource of the macrocell base station where propagation environment eluding a mobile terminal is not good cannot be flexibly allocated. Also, an increase in the number of femtocell base stations 10 results in strengthening an allocation restriction of resources of macrocell base station 7.

According to the above explanation, the following two problems are significant.

(1) In a layered cell configuration, there is a problem that a large cell with large transmission power interferes with the small cell with small transmission power.

(2) When different frequency blocks are fixedly allocated, division loss occurs.

It is an object of the present invention to provide a base station, a mobile communication system, and an interference limiting method that limit the interference from a large cell with large transmission power to a small cell with small transmission power and perform coordinate resource allocation with a femtocell having less division loss of frequency blocks.

Solution to Problem

A base station of the present invention that is used in a mobile communication system including a plurality of base stations having different cell radii, the base station employs a configuration having: a frequency resource average value calculating section that calculates an average value of frequency resources allocated by the base station; and a notification section that determines the calculated frequency resource average value based on a resource allocation recurrence threshold and notifies another base station having a smaller cell radius than the base station of a determined result as frequency resource information.

A base station of the present invention that is used in a mobile communication system including a plurality of base stations having different cell radii, the base station employs a configuration having: an acquisition section that acquires frequency resource information notified from another base station having a larger cell radius than the base station, the information being on the other base station; and a resource allocating section that determines frequency resource allocation of the base station based on the received frequency resource information.

A mobile communication system of the present invention including a first base station having a large cell radius and a second base station having a smaller cell radius than the first base station, the mobile communication system employs a configuration having: the first base station including: a frequency resource average value calculating section that calculates an average value of frequency resources allocated by the first base station; and a notification section that determines the calculated frequency resource average value based on a resource allocation recurrence threshold and notifies the second base station of a determined result as frequency resource information; and the second base station including: an acquisition section that acquires the frequency resource information notified from the first base station; and a resource allocating section that determines frequency resource allocation in a second cell based on the received frequency resource information.

An interference limiting method of the present invention used for a mobile communication system including a first base station having a large cell radius and a second base station having a smaller cell radius than the first base station, the method including the steps of: calculating an average value of frequency resources in the first base station; and determining the calculated frequency resource average value based on a resource allocation recurrence threshold and notifying the second base station of a determined result as frequency resource information.

Advantageous Effects of Invention

According to the present invention, targeting a femtocell base station close to a macrocell base station and performing coordinate resource allocation with a plurality of femtocells using macrocell information can make it difficult to receive interference.

In the case of resource allocation of the femtocell base station close to the macrocell base station, it is possible to avoid the resource allocated by the macrocell base station in transmission as much as possible and to perform the coordinate resource allocation with a femtocell involving less division loss of frequency blocks.

DESCRIPTION OF EMBODIMENTS

Hereinafter, embodiments of the present invention will be described in detail with reference to the accompanying drawings.

Embodiment 1

Figure 1:
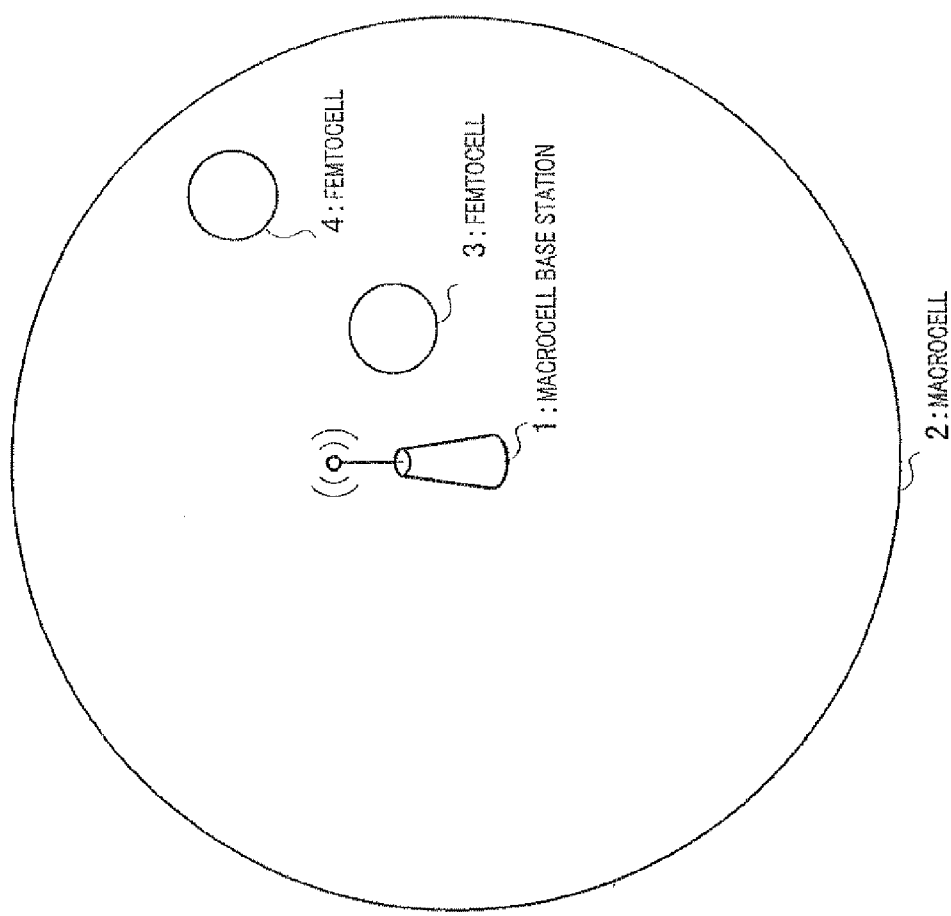
FIG. 1 shows a conventional configuration including a macrocell and a femtocell.
Figure 2:
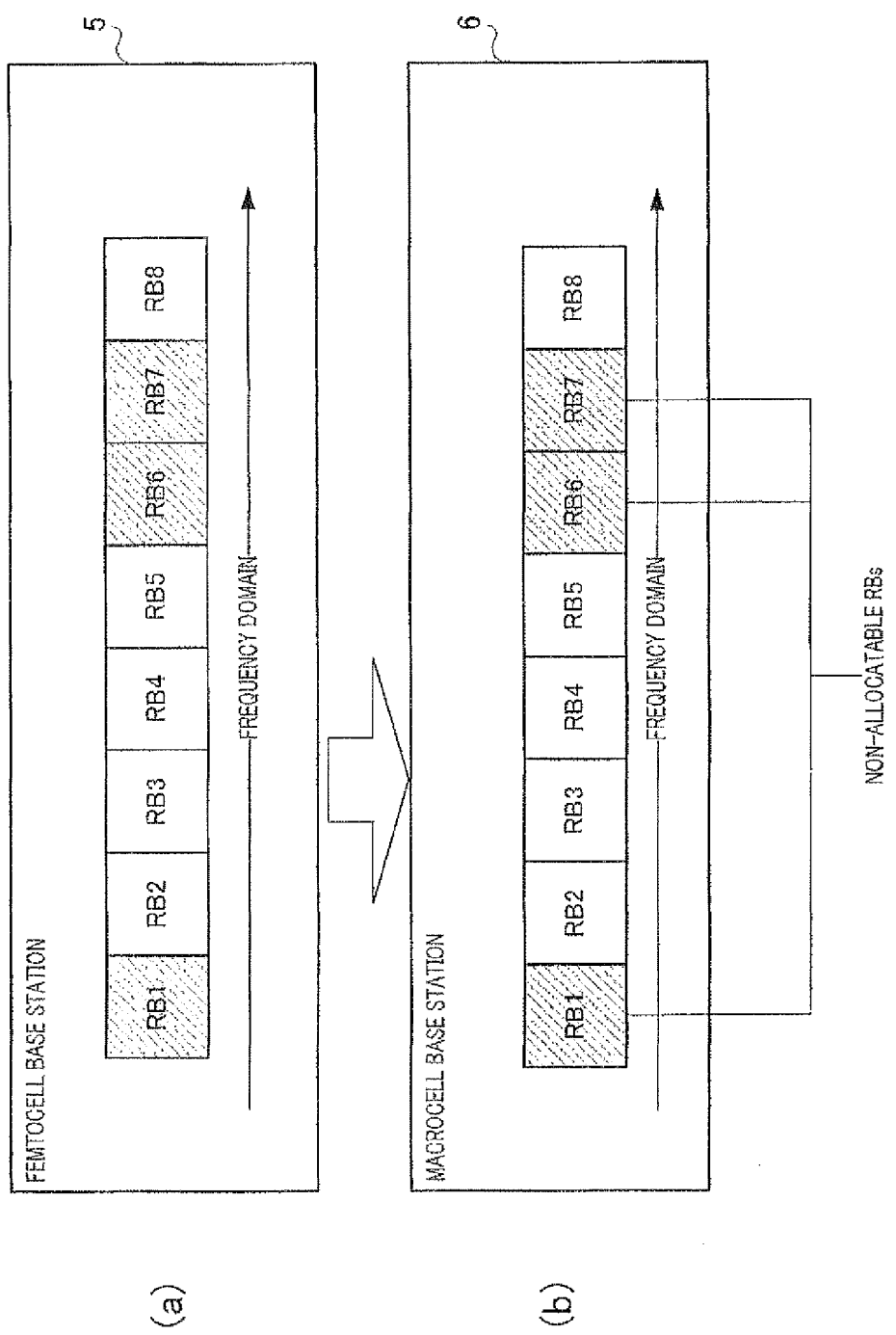
FIG. 2 shows a conventional configuration of frequency domain resource blocks.
Figure 3:
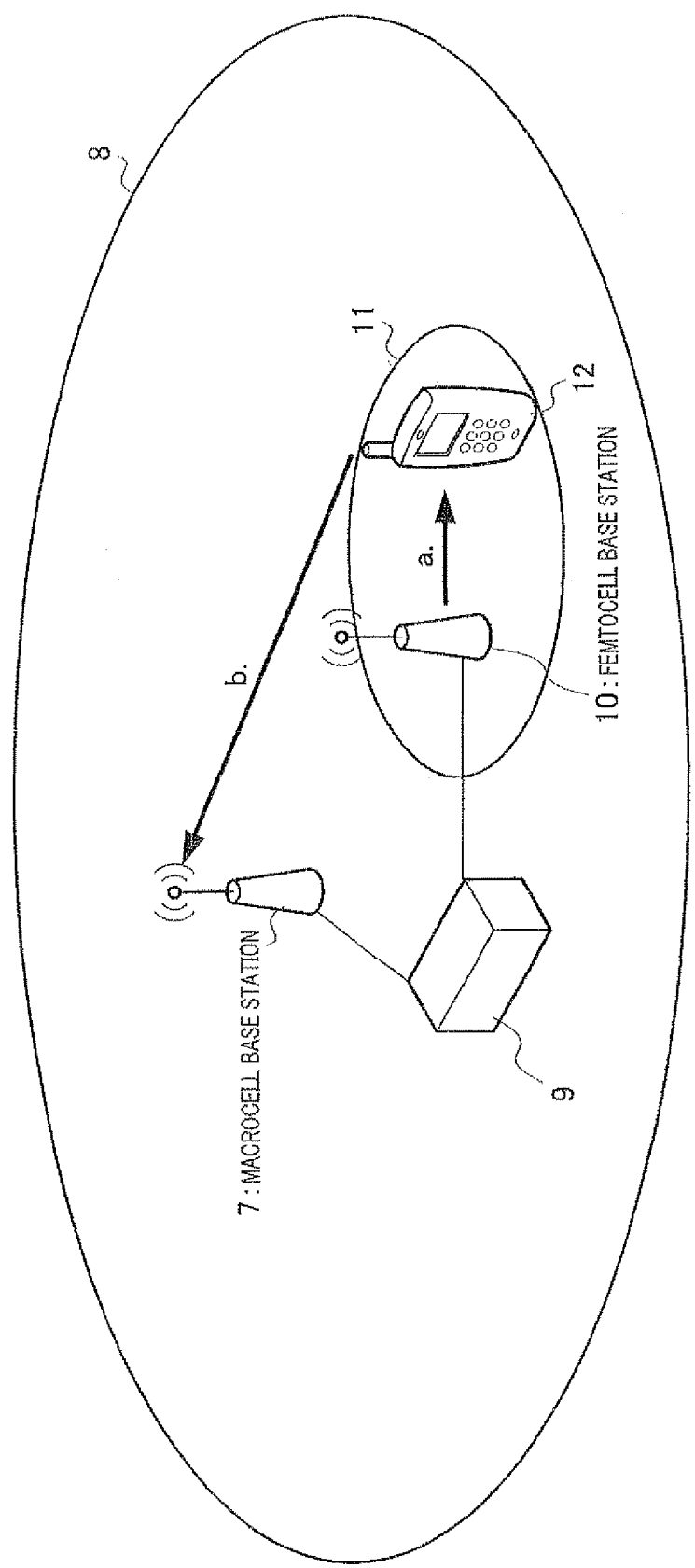
FIG. 3 shows a conventional configuration of communication transmission between a macrocell base station and a femtocell base station.
Figure 4:
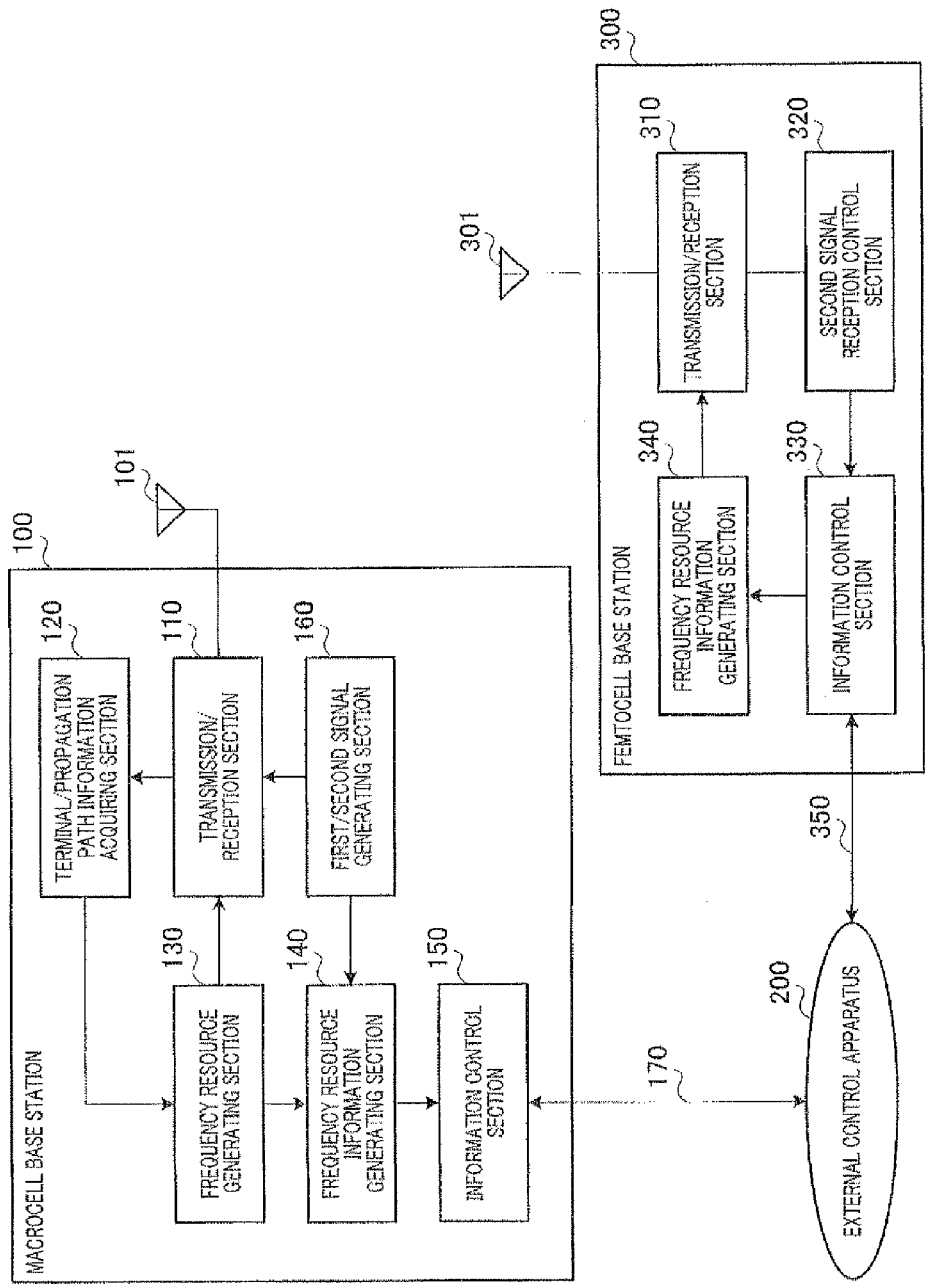
FIG. 4 is a block diagram showing a configuration of a mobile communication system according to Embodiment 1 of the present invention.

FIG. 4 is a block diagram showing a configuration of a mobile communication system according to Embodiment 1 of the present invention. The description of a function block not directly related to interference reduction is omitted in FIG. 4.

As shown in FIG. 4, a mobile communication system includes macrocell base station 100, external control apparatus 200, and femtocell base station 300 having a smaller cell radius than macrocell base station 100.

Macrocell base station 100 is connected to external control apparatus 200 through cable 170. External control apparatus 200 is connected to femtocell base station 300 through cable 350. Macrocell base station 100 and femtocell base station 300 can exchange information with each other via external control apparatus 200. External control apparatus 200 may be connected to a plurality of macrocell base stations and a plurality of femtocell base stations.

Macrocell base station 100 includes antenna 101, transmission/reception section 110, terminal/propagation path information acquiring section 120, frequency resource generating section 130, frequency resource information generating section 140, information control section 150, and first/second signal generating section 160.

Transmission/reception section 110 performs transmission/reception with a terminal and transmits second broadcast information.

Terminal/propagation path information acquiring section 120 acquires information required for generating a frequency resource. Frequency resource generating section 130 allocates resources for each user.

Frequency resource information generating section 140 generates information indicating average resource allocation. To be more specific, frequency resource information generating section 140 calculates the average value of frequency resources allocated by macrocell base station 100. Frequency resource information generating section 140 sets a resource allocation recurrence threshold as will be described below, determines the calculated frequency resource average value based on the resource allocation recurrence threshold, and generates the frequency resource information from the determined result.

Information control section 150 notifies a femtocell of the frequency resource information.

First/second signal generating section 160 generates broadcast information and performs output control. To be more specific, first/second signal generating section 160 generates and outputs: first broadcast information that is cell information usually transmitted to a radio communication terminal; and second broadcast information different from the first broadcast information and used for limiting the area in which the femtocell can be notified.

Femtocell base station 300 includes antenna 301, transmission/reception section 310, second signal reception control section 320, information control section 330, and frequency resource information generating section 340.

Transmission/reception section 310 performs transmission/reception with a terminal in the femtocell and receives the second broadcast information transmitted by a macrocell.

Second signal reception control section 320 confirms that the received broadcast information is the second broadcast information.

On receiving the second broadcast information, information control section 330 acquires the frequency resource information notified by macrocell base station 100.

Frequency resource information generating section 340 performs frequency resource allocation to the terminal in the femtocell based on the frequency resource information acquired from macrocell base station 100.

The operation of the mobile communication system configured as described above will be described below.

Figure 5:
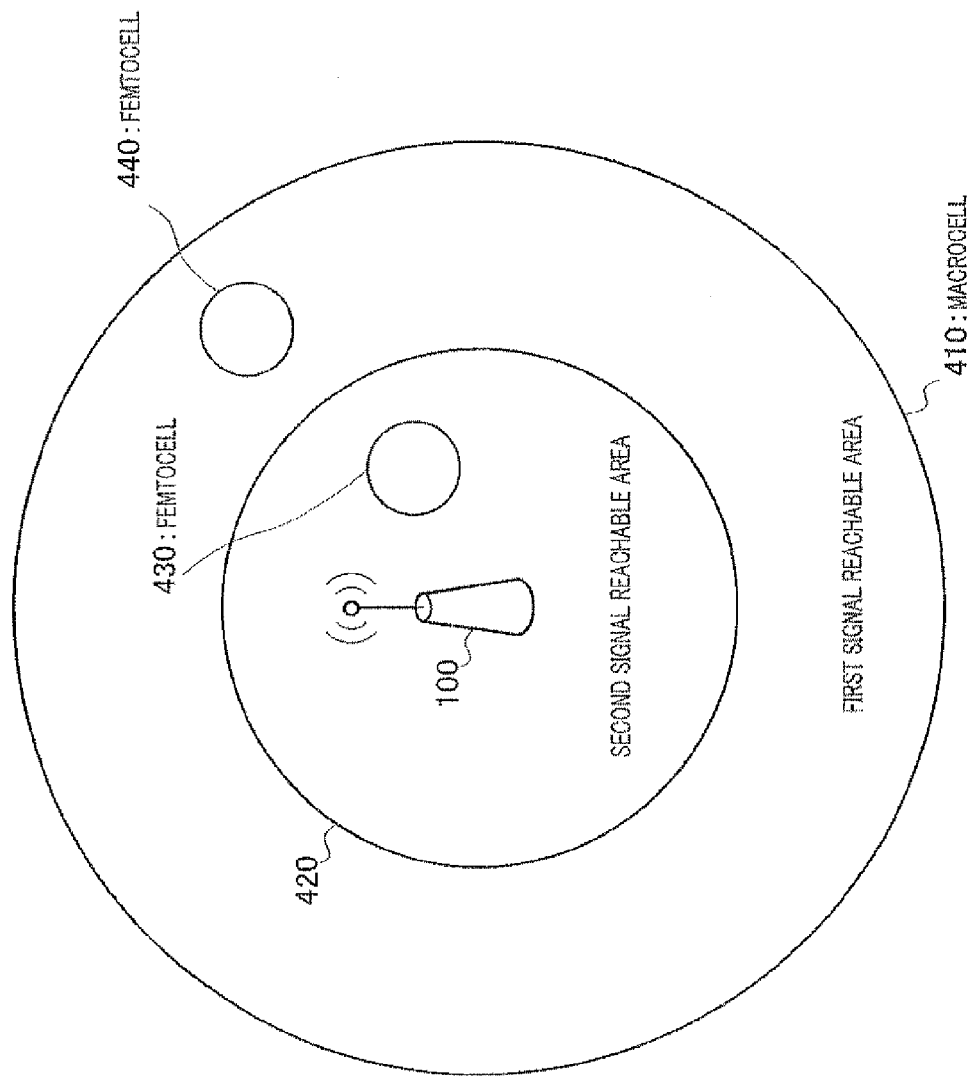
FIG. 5 shows a configuration including a macrocell and a femtocell in the mobile communication system according to Embodiment 1 of the present invention.

FIG. 5 shows a configuration including a macrocell and fem to cells.

As shown FIG. 5, the coverage area of a signal transmitted by macrocell base station 100 using a radio signal is defined as macrocell 410.

Macrocell 410 is defined as a first signal coverage area (hereinafter, macrocell 410 is referred to as first signal coverage area 410 as appropriate), and macrocell base station 100 transmits a first signal. In addition to the first signal, second signal coverage area 420 that is smaller than first signal coverage area 410 is newly set and macrocell base station 100 transmits a second signal that is different from the first signal. The cell radius of second signal coverage area 420 can be set to be variable by adjusting the transmission power of the second signal. It is possible to detect a femtocell located close to macrocell base station 100 by setting the cell radius of second signal coverage area 420 close to macrocell base station 100.

Figure 6:
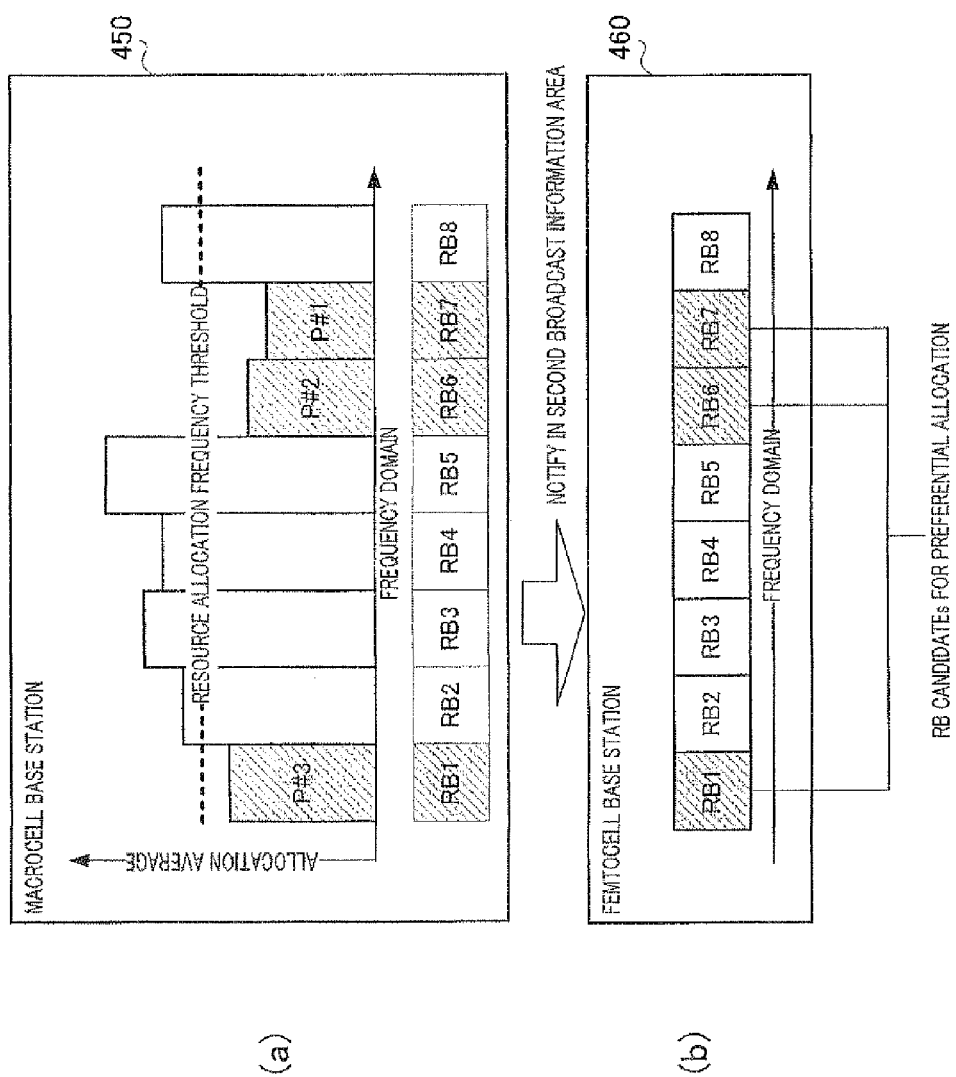
FIG. 6 shows a configuration of frequency domain resource blocks of the mobile communication system according to Embodiment 1 of the present invention.

Femtocell 430 located inside of second signal coverage area 420 and femtocell 440 located inside of first signal coverage area 410 are considered as the femtocells located inside of macrocell 410. There is a problem that macrocell base station 100 with large transmission power interferes with femtocell 430 close to the macrocell base station. FIG. 6 shows a method to allocate frequency resource blocks to femtocell 430 in second signal coverage area 420 in order to detect the femtocell facing the problem.

As described above, a notification area of normal broadcast information is set as first signal coverage area 410, and the area inside of first signal coverage area 410 is set as second signal coverage area 420. In other words, one of features is that two different broadcast information portions limit different areas, respectively.

FIG. 6 shows a configuration of frequency domain resource blocks.

As shown in FIG. 6(a), as configuration 450 of resource blocks (RBs) in a frequency domain of macrocell base station 100, the RBs are given indices in ascending order of frequency from RB1 to RB8.

Macrocell base station 100 measures a resource allocation recurrence, which indicate how many times a resource has been allocated in a predetermined time period, and, by using a threshold for the resource allocation recurrence (the above-mentioned resource allocation recurrence threshold) shown by a broken line in FIG. 6(a), detects an RB lower than the resource allocation recurrence threshold. When the same RBs are used in the femtocell in a case where allocation recurrence is high for each RB, the closer the femtocell is to the macrocell base station, the more likely that the femtocell is interfered with temporally. Meanwhile, when the allocation recurrence of each RB is low, the femtocell has fewer chances to be interfered with under the same conditions. In the conventional example, even though the macrocell base station and the femtocell base station can communicate with each other without mutual interference since both base stations use different RBs for allocation, division loss occurs by limiting the RBs useable by both of the base stations. That is, although there is an RB not used by one of base stations, the other base station cannot use the RB. Thus, it is not possible to perform communication that adaptively allocates the RB.

The present invention provides the resource allocation recurrence threshold in order to reduce chances to receive interference temporally, and makes it possible to perform communication that adaptively allocates RBs while targeting the femtocell that is close to the macrocell base station and that receives especially large interference from the macrocell base station.

It is possible to change the resource allocation recurrence threshold according to the interference occurring in the macrocell.

In configuration 460 of RBs in the femtocell base station shown in FIG. 6(b), when RBs equal to or lower than the resource allocation recurrence threshold are three RBs including RB1, RB6, and RB7, and when the femtocell base station uses three RBs including RB1, RB6, and RB7, the femtocell base station and the macrocell base station interfere with each other, and therefore the macrocell base station determines the aforementioned three RBs as candidates for RBs to be preferentially allocated.

FIG. 6 shows a RB, which is the minimum unit for allocating data to a system band in LTE. Macrocell base station 100 calculates the average value of resource allocations, sets the resource allocation recurrence threshold, and determines an RB having allocation recurrence lower than the threshold. It is one of features to make it difficult to receive interference by limiting influence of power interference on femtocell base station 300 around macrocell base station 100, that is, by avoiding the above RB having high allocation recurrence.

The above RB information lower than the threshold is notified to a femtocell in second signal coverage area 420 in the vicinity of macrocell base station 100, and RBs are defined as allocation candidates in the ascending order of RB allocation recurrence. It is possible to change the resource allocation frequency threshold using the information in the macrocell base station.

Next, communication transmission of macrocell base station 100, external control apparatus 200, and femtocell base station 300 will be described.

Figure 7:
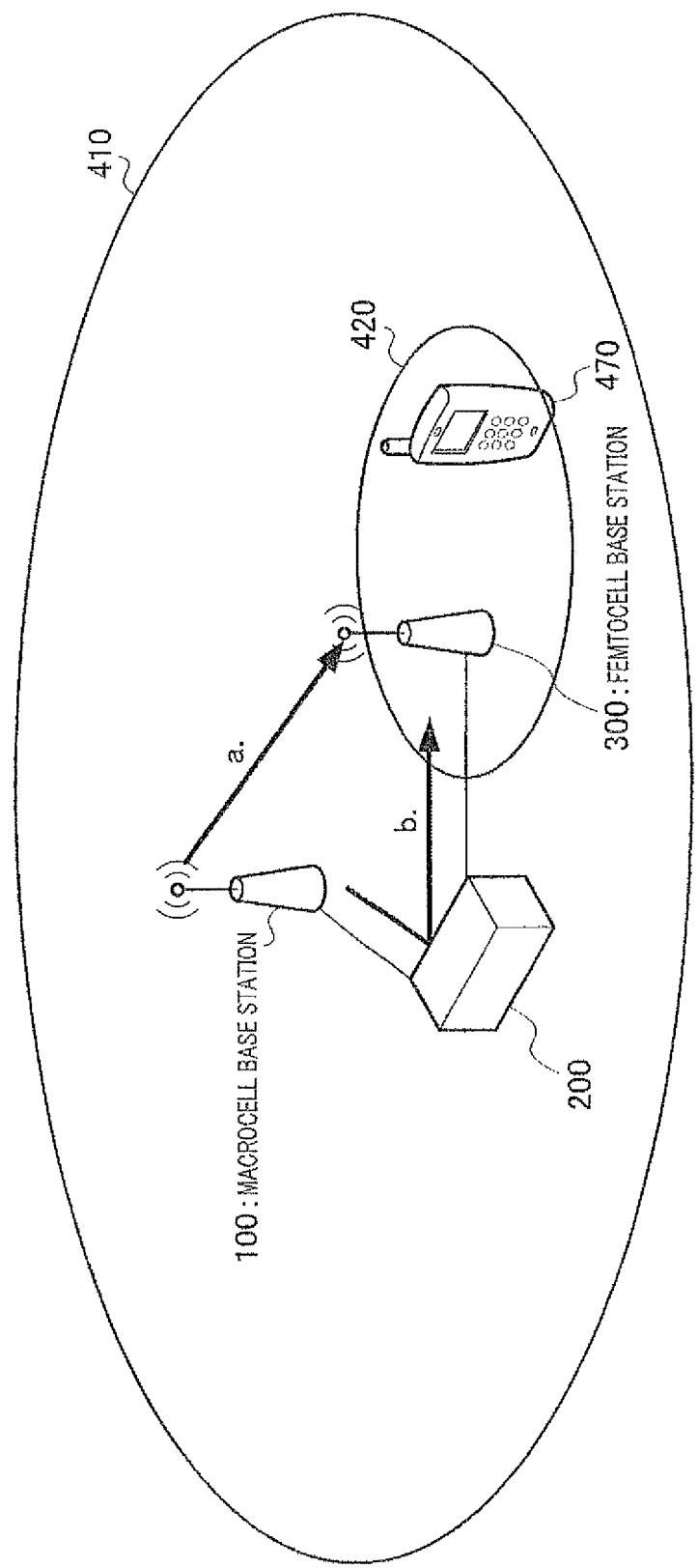
FIG. 7 shows a configuration of communication transmission of a macrocell base station, an external control apparatus and a femtocell base station of the mobile communication system according to Embodiment 1 of the present invention.

FIG. 7 explains a configuration of the communication transmission of macrocell base station 100, external control apparatus 200, and femtocell base station 300. In FIG. 7, configuration parts identical to those in FIG. 5 are assigned the same reference numerals as in FIG. 5.

As shown in FIG. 7, the coverage area of a signal transmitted by macrocell base station 100 using a radio signal is defined as macrocell 410. Macrocell 410 is the first signal coverage area. Also, the coverage area of a signal transmitted by femtocell base station 300 using a radio signal is defined as femtocell 420. Femtocell 420 is the second signal coverage area (hereinafter, femtocell 420 is referred to as "second signal coverage area 420" as appropriate).

As shown in FIG. 7a, macrocell base station 100 transmits the first signal to femtocell base station 300. As described above, in addition to the first signal, second signal coverage area 420 that is smaller than first signal coverage area 410 is newly set, and macrocell base station 100 transmits the second signal that is different from the first signal.

As shown in FIG. 7b, macrocell base station 100 and femtocell base station 300 are connected through external control apparatus 200 using a cable (i.e., broadband line in general).

When femtocell base station 300 can receive the second signal transmitted by macrocell base station 100, this means that femtocell 420 is located inside of the second signal coverage area. After receiving the second signal, femtocell base station 300 notifies macrocell base station 100 via external control apparatus 200 that femtocell base station 300 can receive the second signal. Macrocell base station 100 notifies femtocell base station 300 of information about RB candidates to be preferentially allocated, via external control apparatus 200, femtocell base station 300 being capable of receiving the second signal. Femtocell base station 300 allocates RBs to radio communication terminal 470 in femtocell 420 based on the information about RB candidates to be preferentially allocated, and performs communication.

By this means, in the case of the resource allocation, femtocell base station 300 close to macrocell base station 100 can avoid the resources allocated by macrocell base station 100 in transmission as much as possible and perform coordinate resource allocation with the femtocell having less division loss of the frequency blocks.

Next, the operations of macrocell base station 100, external control apparatus 200, and femtocell base station 300 will be described.

As described above in FIG. 4, macrocell base station 100 is connected to external control apparatus 200. External control apparatus 200 is connected to femtocell base station 300. Macrocell base station 100 and femtocell base station 300 can exchange information with each other via external control apparatus 200. External control apparatus 200 may be connected to a plurality of macrocell base stations and a plurality of femtocell base stations.

In macrocell base station 100, transmission/reception section 110 demodulates the radio signal received through antenna 101. Terminal/propagation path information acquiring section 120 acquires information on a propagation path and terminals in the macrocell, from the demodulated signal.

Frequency resource generating section 130 performs frequency resource allocation using the acquired terminal information and propagation path information. Transmission/reception section 110 generates a transmission signal based on the frequency resource allocation and performs transmission through antenna 101 to radio terminals or femtocell base station 300.

First/second signal generating section 160 generates the first signal or the second signal, and transmission/reception section 110 combines the first signal or the second signal.

Frequency resource information generating section 140 calculates accumulation value and allocation average value of how many times the frequency resources has been allocated by frequency resource generating section 130 per predetermined time period. Frequency resource information generating section 140 detects a frequency resource smaller than the resource allocation recurrence threshold for the calculated resource allocation average value. The detected frequency resource is transmitted to information control section 150 as an RB candidate to be preferentially allocated. Frequency resource detecting processing at frequency resource information generating section 140 may be configured to start when first/second signal generating section 160 generates the second signal.

Information control section 150 notifies the femtocell base station of the information about RB candidates to be preferentially allocated, via external control apparatus 200 with cable 170.

Meanwhile, in femtocell base 300, station transmission/reception section 310 demodulates the radio signal received through antenna 301. Based on the demodulated signal, second signal reception control section 320 checks whether or not the signal transmitted by macrocell base station 100 includes the second signal.

When the second signal is included, information control section 330 acquires the information about RB candidates to be preferentially allocated, from macrocell base station 100 connected thereto via the external control apparatus using cable 350. When no second signal is included, information control section 330 does not acquire the information about RB candidates to be preferentially allocated, from macrocell base station 100 connected thereto via the external control apparatus with cable 350.

When acquiring the information about RB candidates to be preferentially allocated from information control section 330, frequency resource information generating section 340 performs frequency resource allocation based on the acquired information. When the information about RB candidates to be preferentially allocated is not acquired from information control section 330, femtocell base station 300 allocates frequency resources that can be used in the femtocell. This is because the femtocell is not located close to macrocell base station 100, that is, the interference from macrocell base station 100 is not large.

Transmission/reception section 310 generates the transmission signal after the frequency resource allocation and performs communication with the radio communication terminal in the femtocell through antenna 301.

According to the present embodiment described above, macrocell base station 100 includes: frequency resource information generating section 140 that calculates the average value of the frequency resources to be allocated, then determines the calculated frequency resource average value based on the resource allocation recurrence threshold, and generates the frequency resource information based on the determined result; information control section 150 that notifies the femtocell of the frequency resource information; and first/second signal generating section 160 that generates and outputs the first broadcast information that is cell information usually transmitted to a radio communication terminal, and the second broadcast information different from the first broadcast information for limiting the area in which the femtocell can be notified.

Meanwhile, femtocell base station 300 includes second signal reception control section 320 that confirms that the received broadcast information is the second broadcast information; information control section 330 that acquires the frequency resource information notified by macrocell base station 100 on receiving the second broadcast information; and frequency resource information generating section 340 that performs the frequency resource allocation for a terminal in the femtocell based on the frequency resource information acquired from macrocell base station 100.

Macrocell base station 100 notifies femtocell base station 300 of the frequency resource information, and femtocell base station 300 determines the frequency resource allocation in the femtocell based on the information indicating the averaged resource allocation. A target femtocell in this case is limited to the area in which the second broadcast information can be acquired, other than broadcast information that is usually used.

By this means, targeting femtocell base station 300 close to macrocell base station 100 and performing the coordinate resource allocation with a plurality of femtocells using the macrocell information can make it difficult to receive the interference. In other words, when the femtocell autonomously performs optimal frequency allocation and output control, effectively using communication information from the macrocell including the femtocell and also limiting the available area make it possible to perform the coordinate resource allocation for terminals in areas likely to be interfered with each other without using separate frequency channels.

In the case of the resource allocation for femtocell base station 300 close to macrocell base station 100, macrocell base station 100 can avoid the resources allocated by macrocell base station 100 in transmission as much as possible and perform the coordinate resource allocation with the femtocell involving less division loss of the frequency blocks.

Embodiment 2

In Embodiment 1, (1) macrocell base station 100 transmits the second broadcast information. (2) Femtocell base station 300 that receives the second broadcast information confirms the area in which a radio communication terminal can acquire the broadcast information, and acquires the frequency resource allocation information from macrocell base station 100 through the broadband line. In this case, femtocell base station 300 monitors the second broadcast information always or only during start-up. The start-up means the time when the power of femtocell base station 300 is turned on.

In Embodiment 2, the radio communication terminal receives the second broadcast information and notifies the femtocell base station of the area in which the radio communication terminal can acquire the broadcast information. Also, the femtocell base station acquires the frequency resource allocation information from the macrocell base station through the broadband line in this embodiment.

Figure 8:
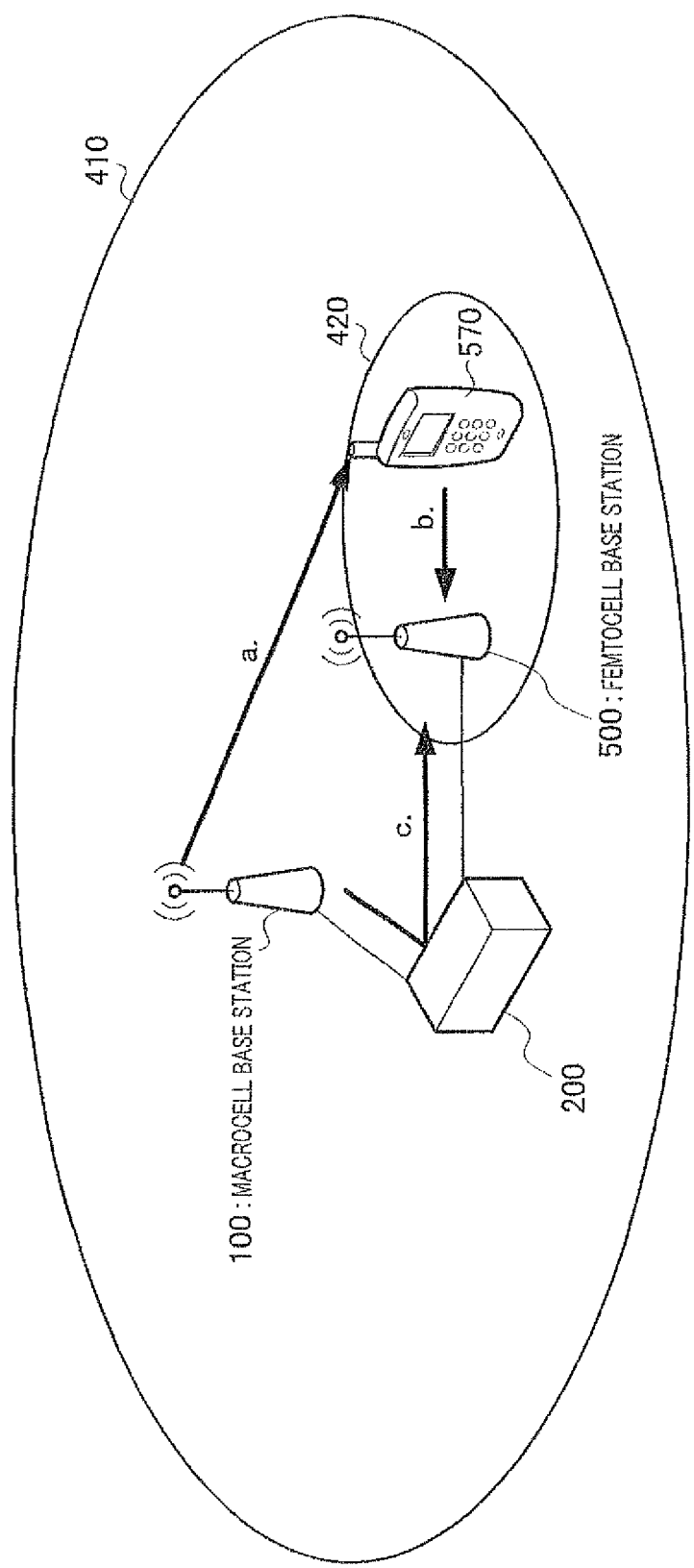
FIG. 8 shows a configuration of communication transmission of a mobile communication system according to Embodiment 2 of the present invention.

FIG. 8 shows a configuration of communication transmission of a mobile communication system according to Embodiment 2 of the present invention. In FIG. 8, configuration parts identical to those in FIG. 7 are assigned the same reference numerals as in FIG. 7, and duplicate descriptions are omitted herein.

The basic configuration and operation of the mobile communication system in Embodiment 2 of the present invention are the same as those in Embodiment 1.

As shown FIG. 8, the coverage area of a signal transmitted by macrocell base station 100 using a radio signal is defined as macrocell 410. Also, the coverage area of a signal transmitted by femtocell base station 500 using a radio signal is defined as femtocell 420. Macrocell base station 100 and femtocell base station 500 are connected through external control apparatus 200 using a cable (i.e., broadband line in general).

As shown in FIG. 8a, when femtocell 420 is located inside of a second signal coverage area and when radio communication terminal 570 located inside of the femtocell can receive a second signal transmitted by macrocell base station 100, radio communication terminal 570 notifies femtocell base station 500 that radio communication terminal 570 can receive the second signal.

After receiving the notification that radio communication terminal 570 can receive the second signal, femtocell base station 500 notifies macrocell base station 100 via external control apparatus 200 that the second signal can be received. Macrocell base station 100 notifies femtocell base station 500, which can receive the second signal, of the information about RB candidates to be preferentially allocated, via external control apparatus 200. Femtocell base station 500 allocates RBs to radio communication terminal 570 in femtocell 420 based on the information about RB candidates to be preferentially allocated, and performs communication.

According to the present embodiment, (1) macrocell base station 100 transmits the second broadcast information. (2) Radio communication terminal 570 that receives the second broadcast information notifies femtocell base station 500 of the area in which a radio communication terminal can acquire the broadcast information. Radio communication terminal 570 monitors the second broadcast information always or only during start-up. (3) Femtocell base station 500 acquires the frequency resource allocation information from macrocell base station 100 through the broadband line. The start-up means the time when the power of radio communication terminal 570 is turned on.

As in Embodiment 1, in the present embodiment, the coordinate resource allocation with a plurality of femtocells using the macrocell information can make it difficult to receive the interference. Also, it is possible to avoid the resources allocated by the macrocell base station in transmission as much as possible and perform the coordinate resource allocation with a femtocell involving less division loss of the frequency blocks.

Embodiment 3

Embodiment 3 shows an example in which transmission of the second broadcast information is stopped or switched to more intermittent consecutive broadcast, when there is no femtocell in the second broadcast area.

Figure 9:
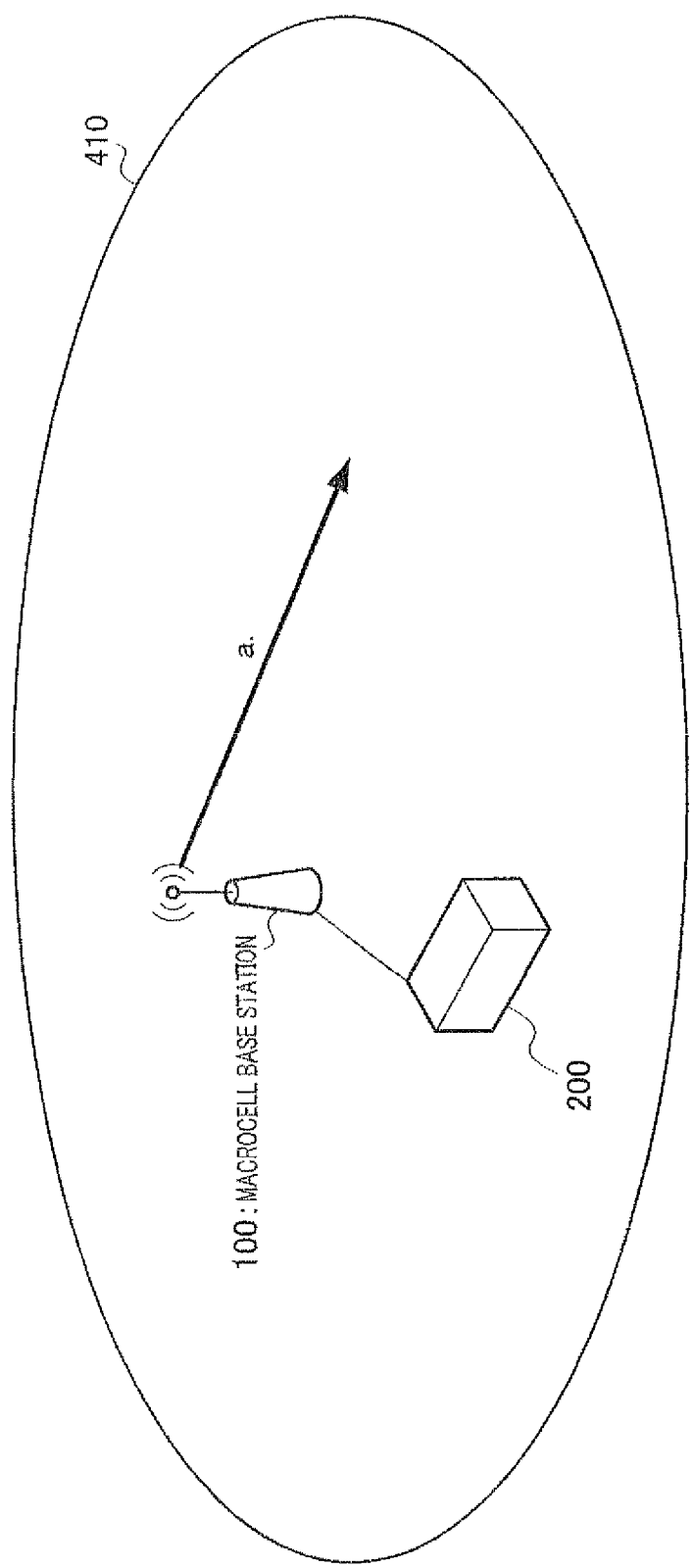
FIG. 9 shows a configuration of communication transmission of a mobile communication system according to Embodiment 3 of the present invention.

FIG. 9 shows a configuration of communication transmission of a mobile communication system according to Embodiment 3 of the present invention. In FIG. 9, configuration parts identical to those in FIG. 7 are assigned the same reference numerals as in FIG. 7, and duplicate descriptions are omitted herein.

The basic configuration and operation of the mobile communication system in Embodiment 3 of the present invention are the same as those in Embodiment 1.

As shown FIG. 9, the coverage area of a signal transmitted by macrocell base station 100 using a radio signal is defined as macrocell 410. Macrocell base station 100 is connected to external control apparatus 200 using a cable (i.e., broadband line in general).

In a case where there is a femtocell base station in macrocell 410, upon receipt of a second signal, the femtocell base station notifies macrocell base station 100 via external control apparatus 200 that the femtocell base station can receive the second signal. However, as shown in FIG. 9a, when there is no femtocell in macrocell 410, macrocell base station 100 does not receive any notification that the second signal can be received. In other words, macrocell base station 100 can determine the presence or absence of femtocell in macrocell 410 according to the presence or absence of the notification.

Macrocell base station 100 can change the period, the number of times, and/or the timing to transmit the second signal in accordance with the presence or absence of the femtocell.

According to the present embodiment, macrocell base station 100 transmits the second broadcast information. When there is no femtocell in the second broadcast area, macrocell base station 100 stops transmitting the second broadcast information or switches to more intermittent broadcast.

In the above embodiments, the broadcast information from the macrocell base station is used to limit the area. That is, the broadcast information is used to detect a femtocell in the vicinity of the macrocell base station having large interference power.

Also, the frequency resource allocation information is not transmitted but acquired through the broadband line. By this means, it is possible to continuously monitor macrocell information that is update information and an initial parameter during setup of a femtocell base station.

The above description is an illustration of preferred embodiments of the present invention and the scope of the invention is not limited to this.

Although the terms including a base station, a mobile communication system, and an interference limiting method are used in the above embodiments for the sake of the explanation, the apparatus may be a communication system, a base station apparatus, a mobile information terminal, and the method may be an interference controlling method, for example.

Furthermore, the above described femtocell base station and each component element of the femtocell base station such as a type of transmission/reception section or frequency resource generating section is not limited to the above described embodiments.

Although the above embodiments have been described using a case where the present invention is implemented with hardware, as an example, the present invention can be implemented with software.

Each function block employed in the description of each of the aforementioned embodiments may typically be implemented as an LSI constituted by an integrated circuit. These functional blocks may be individual chips or partially or totally contained on a single chip. The term "LSI" is adopted herein but this may also be referred to as "IC," "system LSI," "super LSI," or "ultra LSI" depending on differing extents of integration.

The method of implementing integrated circuitry is not limited to LSI, and implementation by means of dedicated circuitry or a general-purpose processor may also be used. After LSI manufacture, utilization of an FPGA (Field Programmable Gate Array) or reconfigurable processor where connections and settings of circuit cells in an LSI can be reconfigured is also possible.

If a new integrated circuit implementation technology replacing LSI is introduced because of advancement in semiconductor technology or a different technology derived therefrom, the function blocks may of course be integrated using that technology. For example, application of biotechnology is possible.

The disclosure of Japanese Patent Application No. 2010-123314, filed on May 28, 2010, including the specification, drawings and abstract, is incorporated herein by reference in its entirety.

INDUSTRIAL APPLICABILITY

The base station, the mobile communication system and the interference limiting method of the present invention are useful to reduce the radio channel interference to a femtocell base station from a terminal connected to a macrocell base station. The mobile communication system and interference limiting method of the present invention can be used in a mobile phone communication system.

REFERENCE SIGNS LIST

100 Macrocell base station
101, 301 Antenna
110, 310 Transmission/reception section
120 Terminal/propagation path information acquiring section
130 Frequency resource generating section
140, 340 Frequency resource information generating section
150, 330 information control section
160 First/second signal generating section
170, 350 Cable
200 External control apparatus
300 Femtocell base station
320 Second signal reception control section

The invention claimed is:

1. A base station used in a mobile communication system including a plurality of base stations having different cell radii, the base station comprising:
frequency resource average value calculating circuitry that calculates an average value of frequency resources allocated by the base station; and
notification circuitry that determines the calculated frequency resource average value based on a resource allocation frequency threshold and notifies another base station having a smaller cell radius than the base station of a determined result as frequency resource information,
wherein the base station transmits, at a first transmission power defining a first signal coverage area, first broadcast information that is cell information usually transmitted to a radio communication terminal in radio communication with the base station; and transmits, at a lower second transmission power defining a smaller second signal coverage area, second broadcast information different from the first broadcast information, wherein the frequency resource information notified to the other base station is based on whether the other base station is in the first or second signal coverage area.

2. The base station according to claim 1, wherein the base station stops transmission of the second broadcast information or switches to an intermittent transmission when the other base station is not present within the smaller second signal coverage area.

3. The base station according to claim 2, wherein, when receiving the second broadcast information from the other base station, the acquisition circuitry confirms the smaller second signal coverage area, and acquires the frequency resource information received from the other base station via an external control apparatus that connects the other base station and the base station.

4. The base station according to claim 2, wherein the acquisition circuitry:
receives a control signal indicating the smaller second signal coverage area in which the second broadcast information may be received, from the radio communication terminal; and
acquires the frequency resource information from the other base station via an external control apparatus that connects the other base station and the base station.

5. The base station according to claim 1, wherein the base station monitors the second broadcast information always or only during start-up.

6. The base station according to claim 2, wherein the external control apparatus connects the other base station and the base station through a broadband line.

7. The base station according to claim 1, wherein the size of the smaller second signal coverage area is variable.

8. The base station according to claim 1, wherein the resource allocation frequency threshold is determined based on interference occurring at the base station.

9. The base station according to claim 1, wherein the resource allocation frequency threshold indicates how many times a resource can be allocated in a predetermined time period.

10. The base station according to claim 1, wherein the determined result that is notified to the other base station as frequency resource information comprises a current allocation of frequency resources, allocated by the base station to the other base station, none of which are currently allocated to the base station.

11. A base station used in a mobile communication system including a plurality of base stations having different cell radii, the base station comprising:
acquisition circuitry that acquires frequency resource information notified from another base station having a larger cell radius than the base station, the information being on the other base station; and
resource allocating circuitry that determines frequency resource allocation of the base station based on the received frequency resource information, wherein:
the acquisition circuitry acquires the frequency resource information received from the other base station when receiving second broadcast information transmitted from the other base station at a lower second transmission power defining a smaller second signal coverage area, different from first broadcast information transmitted from the other base station at a higher first transmission power, defining a larger first signal coverage area; and
the resource allocating circuitry performs frequency resource allocation of the base station based on the acquired frequency resource information.

* * * * *